March 19, 1940.  E. B. DEWEY  2,194,384
ENLARGING APPARATUS FOR MAKING ENLARGEMENTS FROM PHOTOGRAPHIC NEGATIVES
Filed May 23, 1939  3 Sheets-Sheet 2
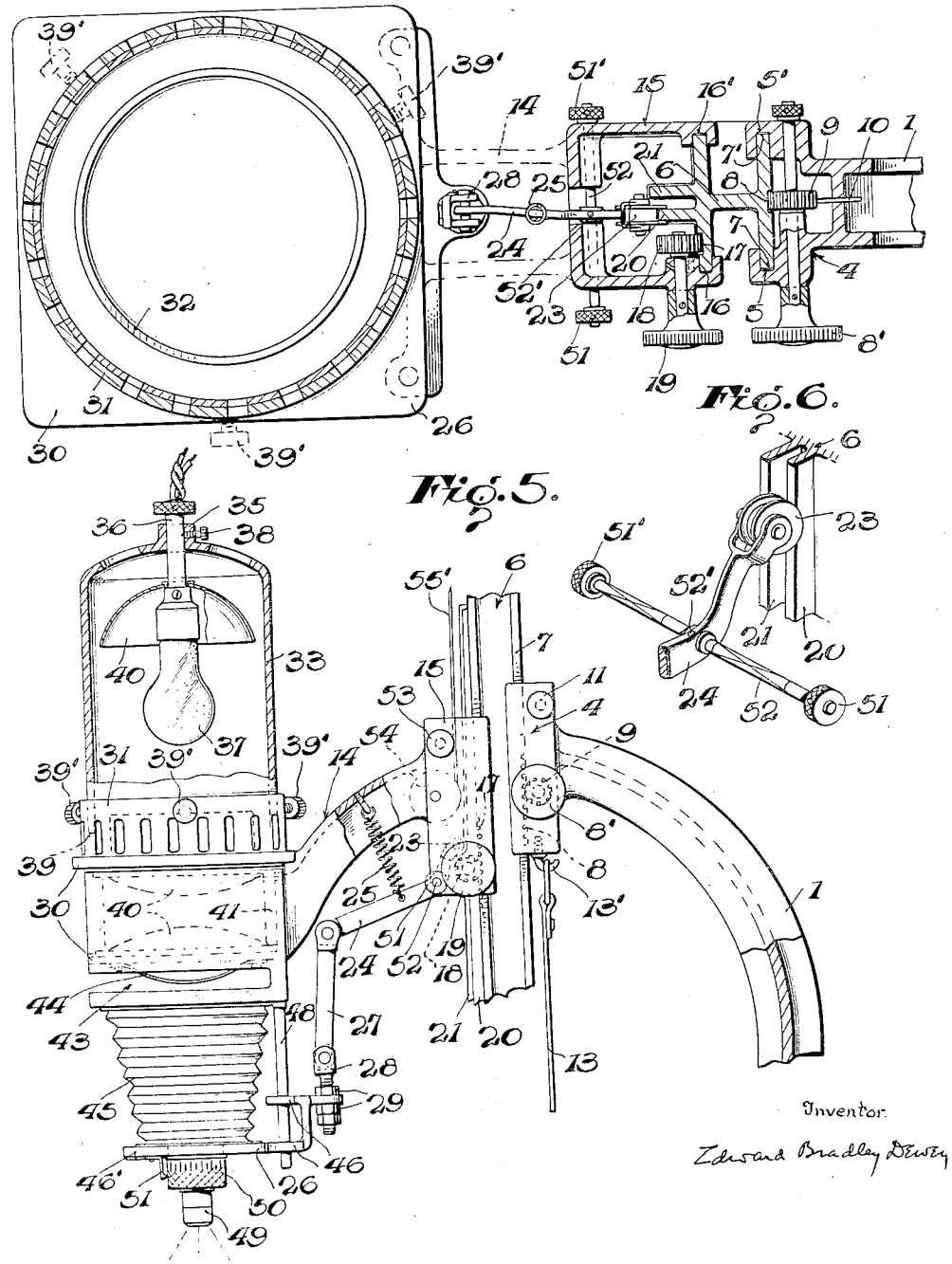
Inventor
Edward Bradley Dewey March 19, 1940. E. B. DEWEY 2,194,384
ENLARGING APPARATUS FOR MAKING ENLARGEMENTS FROM PHOTOGRAPHIC NEGATIVES
Filed May 23, 1939 3 Sheets-Sheet 3
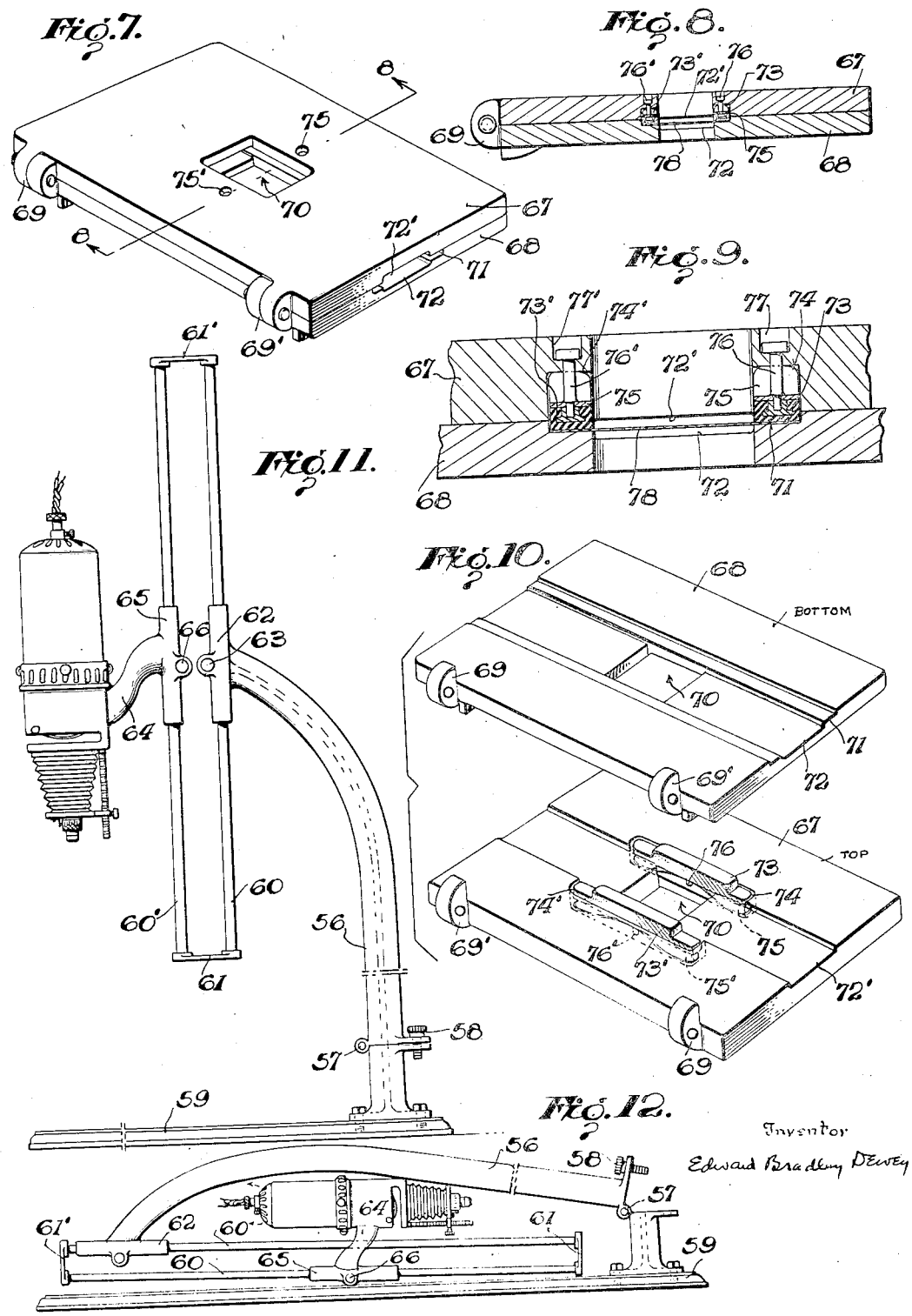
Inventor
Edward Bradley Dewey Patented Mar. 19, 1940

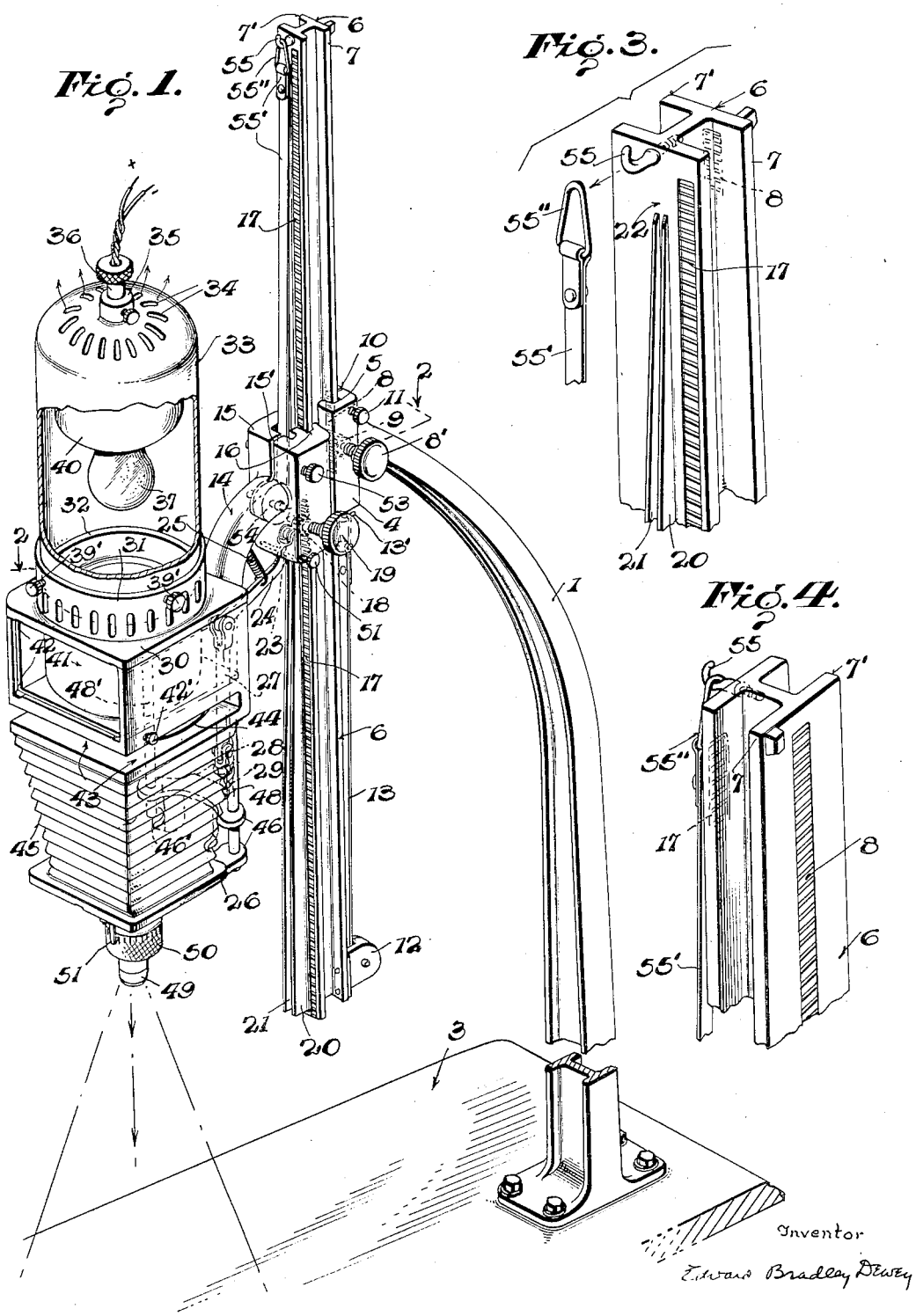

2,194,384

UNITED STATES PATENT OFFICE 2,194,384

ENLARGING APPARATUS FOR MAKING ENLARGEMENTS FROM PHOTOGRAPHIC NEGATIVES

Edward Bradley Dewey, Washington, D. C.

Application May 23, 1939, Serial No. 275,290

12 Claims. (Cl. 88—24)

The object of my invention is to provide an enlarging apparatus for photographic use which is simple in construction and inexpensive to manufacture, and will give automatic focusing over the normal range of enlargements and manual focusing when enlargements of greater size are required, and will adapt itself to the use of one or more lenses of different focal length by the shifting of the focusing lever and roller to engage one or the other of two parallel cams, each cam being designed to fit a lens of different focal length; one cam with a short focal length lens covering miniature negatives and the other cam with a lens of longer focal length for the use of negatives of a larger size.

In order to obtain big enlargements, or to make a big enlargement of a small portion of a negative, it is in the usual type of enlarger necessary to have a very long standard or post to carry the enlarger head a suitable distance above the easel or to reverse the enlarger and place the easel on the floor.

In my invention by using a second standard slidingly attached to the standard attached to the base board, and having the enlarger slidingly attached to the opposite side of the sliding standard, I am able to double the capacity of my enlarger without increasing the height of my fixed standard, nor is there any blind spot or obstruction in the full vertical travel of my enlarger.

In the operation of my invention the sliding standard is lowered all the way and in that position the enlarging apparatus is automatic focusing. This continues until the head has reached the top of its travel, at which point the cam action stops and to increase the size of the enlargement the sliding standard is raised; the objective which is mounted in a focusing mount is then used for focusing.

The sliding standard is formed in the shape of an H the sides acting as guides that fit in parallel grooves in the head of the stationary standard attached to the base board and in parallel grooves in the arm attached to the enlarger head. On the flat surface which is formed by the two guides that slide in the fixed standard is a rack engaging a pinion in the stationary standard by which the sliding standard is raised and lowered. At the bottom of the sliding standard is a spring counter balance, the tape of which is attached to the under side of the top of the stationary standard.

On the flat surface opposite forming the two guides that slide in parallel grooves attached to the arm supporting the enlarger head, is a rack that engages a pinion in the sliding arm by which the enlarging head is raised or lowered. This is counter-balanced by a spring balance set in the sliding arm and attached to the upper end of the sliding standard.

On the same side and running parallel to the rack are two cams designed to control lenses of different focal length through a bell crank and roller and connecting links pivotally attached to the member to which the lens is attached.

Another part of my invention consists of a pair of mounted condensers that slide into the enlarger housing above the negative that may be removed at will for cleaning without disturbing any other part of the enlarger and to facilitate the quick changing of condensers to match the lenses of different focal length.

Another part of my invention is the method of forming the body of the enlarger combining in one unit the method of holding the condensers, the lower ventilating system including the light trap and the attaching arm and the detachable lamp housing.

Another part of my invention consists of a negative holder for my enlarger which consists of two flat members made of any material, preferably of Bakelite or a suitable opaque plastic material hinged on one side to open like a book, an opening in the center to allow light to pass through the negative, a parallel groove formed on the lower inside surface of the bottom member the width of the film or negative, parallel to the hinged sides, and inside that parallel groove another slightly deeper and narrower parallel groove the width of the exposed portion of the negative; to keep any part of the negative holder from coming in contact with printable portion of the lower surface of the negative and a similar groove on the inside of the upper member of the negative holder to eliminate any chances of marring the upper surface of the negative, and on the under side of the upper portion of the negative holder are inserted two narrow parallel strips running parallel to the grooves making contact on the ridge formed by the two parallel grooves in the lower member of the negative holder and movable under spring tension so as to grip the unexposed edge of the negative and hold it firmly in a flat plane against the lower portion of the negative holder; there being enough movement in the parallel hold-down strips to take care of the difference in the thickness in the different negatives used.

Another adaption of my invention is an enlarging apparatus as shown in Fig. 11, in which the sliding standard is composed of two parallel members held together at each end; the enlarging head and stationary standard are slidingly attached to opposite members, and a clamp to lock each in place. My invention also includes the sliding standard made of parallel tubes or rods so that the enlarger head and stationary standard are slidingly and pivotally attached with a clamp to lock each in place and the stationary standard is hinged a short distance above the base board so that the whole enlarger will fold over on the base board facilitating the storage of same.

My invention relates to an enlarging apparatus for photographic use made of any metal, preferably of an aluminum alloy in the form of die castings, but can be made by other methods, and I reserve the right to make such changes that will facilitate the manufacture of my invention as long as I do not deviate from the principles of my invention.

Other objects and advantages of my invention will appear from the following description and accompanying drawings in which similar numerals refer to similar parts in the several views.

Figure 1 is a perspective view of the enlarging apparatus set up with parts broken and in section.

Figure 2 is a plain sectional view drawn generally on the line 2—2 of Figure 1 looking in the direction of the arrows.

Figure 3 is a detail perspective separate enlarged view of the movable standard as shown in Figure 1.

Figure 4 is a detail perspective enlarged detail view similar to Figure 2 only from the rear of the movable standard.

Figure 5 is an enlarged fragmentary detail view of Figure 1 with parts broken away and parts in section.

Figure 6 is an enlarged detail perspective view of the cams and its associated parts.

Figure 7 is a perspective view of the negative holder in a closed position.

Figure 8 is a cross-sectional view drawn on the line 8—8 of Figure 7 looking in the direction of the arrows.

Figure 9 is an enlarged detail sectional view of Figure 8 to show the light window and associated parts.

Figure 10 is a detail disassembled perspective view of Figure 7 showing the bottom and top inverted.

Figure 11 shows a side elevation of a modified form of making my enlarger without the automatic focusing feature, but giving a double range of enlarging.

Figure 12 is another side elevation of Figure 11 showing the enlarger folded for the purpose of storage.

In Figure 1 of my enlarging apparatus a channel shaped standard 1 is mounted on a suitable base 3, the upper part of standard 1 is formed with a head 4 in which are parallel grooves 5 and 5' more clearly shown in Figure 2. The sliding standard 6 is formed in the shape of an H and the guides 7 and 7' slide in the grooves 5 and 5'. On the back of sliding standard 6 is a rack 8 which engages pinion 9, Figure 2, and is moved by knob 9' which is journaled in head 4. A slot 10 cut in head 4 is clamped by locking screw 11, locking sliding standard 6 in any adjustment. Sliding standard 6 is counter-balanced by spring balance 12 which is attached to the back of sliding standard 6 at its lower end and attached to head 4 by spring reel strap 13 and lug 13'.

The enlarger is attached by a U shaped arm 14 to a sliding bracket 15 having two parallel grooves 16 and 16', more clearly shown in Figure 2 sliding on parallel ways similar to 7 and 7'. On the front of sliding standard 6 is a rack 17 which engages pinion 18, which is moved by knob 19 journaled in member 15.

Cams 20 and 21 on the front of sliding standard 6 extend almost to the top, stopping at point 22 so that roller 23 may be shifted from cam 20 to cam 21 depending upon the focal length of the lens used.

Pivoted in the lower portion of sliding member 15 is a bell crank 24 with a roller 23 which engages cams 20 or 21, and is held in contact with the cams by spring 25. The bell crank 24 is pivotally attached to sliding lens carrier 26 by link 27. Part 28 which pivotally engages link 27 is threaded and with lock nuts 29 make it adjustable so that the cam action may be adjusted to each enlarger.

The condenser housing 30 has on its upper side a ventilating ring 31 with openings therein to let in air and inside another ring 32 that acts as a light trap. The lamp housing 33 has ventilating holes 34 formed in the top and a collar 35 in which slides a tube 36 carrying the light bulb 37 and which is arranged to slide vertically to adjust the light and is locked by screw 38. The lamp housing 33 fits inside of the ventilating ring 30 resting on flange 39 and is held in place by set screws 39'. Reflector 40 is attached to tube 36 and is also used to form a light trap.

The condensers 40 are mounted in a frame 41 which slides into the condenser housing 30 from the front and is held in place by guides 42 and locking screw 42'. The negative holder opening 43 has flat springs 44 inserted in the bottom of each of its upper sides that hold the negative holder Figure 7 firmly against its lower side. A bellows 45 connects the lower side of holder 43 with the movable lens carrying member 26. Movable lens carrying member has two guides 46 and 46', which are slidingly attached to rods 48 and 48' controlling the vertical movement of bellows 45.

A lens 49 is mounted in a focusing mount 50 attached to movable lens member 26 and the lens 49 is locked for automatic focusing by a spring lug 51 fitting in a groove on the outside of focusing mount 50.

By pushing knobs 51 and 51' shown more clearly in Figure 2 in or out of the shaft 52 carrying bell crank 24 which is pinned to shaft 52 with pin 52' of the roller 23 is moved to cam 20 or 21 as may be required. Member 15 is split at 15' and is locked in any position by clamping screw 53. The enlarging head is counter-balanced by spring balance 54 placed under the U-shaped arm 14 and attached to lug 55 by strap 55' and loop 55".

Another form of my invention is shown in Figure 11. A standard 56 hinged at 57 and fastened by screw 58 is attached to baseboard 59. Two parallel members 60 and 60' are held together by cross members 61 and 61'. Member 60 is slidingly attached to standard 56 at 62 and is locked by clamp 63. The enlarger arm 64 is slidingly attached to member 60' at 65 and is locked by clamp 66.

In Figure 12 I have shown how by loosening screw 58 the stand 56 folds down on baseboard to facilitate the storage of same.

Another part of my invention is the negative holder as shown in Figure 7. An upper plate 67 is hinged to a lower plate 68 at 69 and 69' so as to open like a book. An opening 70 is formed through both plates to permit the passage of light. In the lower plate a groove 71 is formed to take a negative and in both the upper and lower plates are grooves 72 and 72' the width of the picture part of the negative. The larger groove 7l being the full width of the negative and the difference in width of grooves 7l and 72 acts as a slide to keep the picture part of the negative from coming in contact with the negative holder thereby avoiding all possibilities of damaging the negative. Strips 73 and 73' are movable in grooves 74 and 74' and are forced outwardly by springs 75 and 75' sliding on counter sunk rods 76 and 76' in holes 77 and 77'. Strips 73 and 73' press down on negative 78 on its unused sides holding it securely in a flat plane.

Obviously numerous modifications are possible and I contemplate as within the scope of my invention as defined in the appended claims all such alternative and equivalent structures.

I claim:

1. An enlarging apparatus comprising a stationary standard having a head; an enlarger casing having a head; and a movable standard having opposite sides adjustably connected with both heads, and the heads being disposed in different vertical planes whereby the heads may pass each other for movement throughout the length of the movable standard.

2. An enlarging apparatus comprising a stationary standard having a head provided with opposed guides; an enlarger casing having a head provided with opposed guides; and a movable standard having its side edges engaged in the opposed guides in said heads; said heads each having a split intermediate the guides; and means for contracting the split portions of the heads to clamp the sides of the support.

3. An enlarging apparatus comprising a stationary standard having a head provided with opposed guides; an enlarger casing having a head provided with opposed guides; and a movable standard being of H-shaped cross-section and engaging the opposed guides in the said heads; cooperating means on the movable standard and heads for raising and lowering the heads thereon; said heads each having a split intermediate the guides; and means for contracting the split portions of the heads to clamp the sides of the support.

4. An enlarging apparatus comprising a stationary standard having a head; an enlarger casing having a head; and a movable standard having opposite sides adjustably connected with both heads whereby the heads may pass each other for movement throughout the length of the movable standard, said casing having a lens support; a cam on the movable standard, a pivotally mounted bell-crank lever on the casing head having one end engaging said cam, and the other end connected with the lens support, whereby movement of the casing on the movable support will automatically focus the lens.

5. An enlarging apparatus comprising a stationary standard having a head; an enlarger casing having a head; and a movable standard having opposite sides adjustably connected with both heads whereby the heads may pass each other for movement throughout the length of the movable standard; said casing having a lens support; a plurality of parallel cams on the movable standard; a pivotally mounted bell-crank lever on the casing head having one end adapted to engage said cams, and the other end connected with the lens support, and means for transferring the cam end of said lever from one cam to another depending upon the focal length of the lens in the support, whereby movement of the casing will automatically focus the lens.

6. An enlarging apparatus comprising an enlarging casing, a stationary standard; a movable standard consisting of parallel members held together by cross members at each end and slidingly connecting the enlarging casing and the stationary standard; and means of locking the casing and stationary standard to the movable standard.

7. An enlarging apparatus comprising a base; an enlarging casing, a stationary standard hinged near the base and attached thereto, a movable standard consisting of parallel members held together by cross members at each end and slidingly connecting the enlarging casing and the stationary standard, and means of locking the casing and stationary standard to the movable standard.

8. An enlarging apparatus comprising a stationary standard, a movable standard supported by the stationary standard, an enlarging casing slidingly attached to the movable standard, an adjustable lens support on the casing; a plurality of parallel cams on the movable standard, a pivotally mounted bell-crank lever on the casing head having one end adapted to engage said cams, and the other end connected with the lens support; and means for transferring the cam end of said lever from one cam to another depending upon the focal length of the lens, whereby movement of the casing will automatically focus the lens.

9. In apparatus as set forth in claim 8, said bell-crank lever being mounted on an axially shiftable shaft having its ends projecting beyond the sides of the head, and means for manually shifting the shaft.

10. In apparatus as set forth in claim 8, said cams terminating adjacent one end of the standard, and said bell-crank lever being mounted on an axially shiftable shaft having its ends projecting beyond the sides of the head, and means for manually shifting the shaft when the head is moved on the standard beyond the ends of the cams.

11. An enlarging apparatus, having automatic focusing by means of a cam over its normal range and manual focusing by means of a focusing mount in the larger sizes, comprising a stationary standard, a movable standard slidingly attached to the stationary standard, an enlarging casing slidingly attached to the movable standard and having a lens support, a cam on the movable standard, a pivotally mounted bell-crank lever on the casing head having one end engaging said cam and the other end connected with the lens support, whereby movement of the casing on the movable standard will automatically focus the lens during automatic focusing.

12. An enlarging apparatus, having automatic focusing by means of two cams over its normal range of enlargements and having manual focusing by means of a focusing mount for the larger enlargements, comprising a stationary standard, a movable standard slidingly attached to the stationary standard, an enlarging casing slidingly attached to the movable standard and having a lens support, parallel cams on the movable standard, a pivotally mounted bell-crank lever on the casing head having one end adapted to engage said cams and the other end connected with the lens support, and means for transferring the cam end of said lever from one cam to another depending upon the focal length of said lens, whereby movement of the casing will automatically focus the lenses during automatic focusing.

EDWARD BRADLEY DEWEY